United States Patent [19]
Stewart et al.

[11] Patent Number: 4,732,748
[45] Date of Patent: Mar. 22, 1988

[54] FINELY DIVIDED CALCIUM CARBONATE COMPOSITIONS

[75] Inventors: Robert D. Stewart, Yorba Linda, Calif.; Norman O. Clark, Par, England; Yew C. Chang, Westlake Village, Calif.

[73] Assignee: Cyprus Mines Corporation, Englewood, Colo.

[21] Appl. No.: 940,533

[22] Filed: Dec. 10, 1986

[51] Int. Cl.$^4$ .............................................. C01F 11/18
[52] U.S. Cl. .................................. 423/430; 423/635; 162/181.2
[58] Field of Search ............... 423/430, 635, 636, 637; 106/306; 162/181.2

[56] References Cited

U.S. PATENT DOCUMENTS

| | | | |
|---|---|---|---|
| 3,245,834 | 4/1966 | Van Note | 423/430 |
| 3,597,251 | 8/1971 | Kaufman | 162/181.2 |
| 3,853,488 | 12/1974 | Taylor | 423/430 |
| 4,026,762 | 5/1977 | Bauman | 162/181.2 |
| 4,159,312 | 6/1979 | Shibazaki et al. | 423/430 |
| 4,170,658 | 10/1979 | Skinner et al. | 423/430 |
| 4,237,147 | 12/1980 | Merten et al. | 423/430 |
| 4,242,318 | 12/1980 | Brahm et al. | 106/306 |
| 4,244,933 | 1/1981 | Shibazaki et al. | 106/306 |
| 4,293,097 | 10/1981 | Lewis et al. | 241/20 |
| 4,610,801 | 9/1986 | Matthews et al. | 162/181.2 |

Primary Examiner—Helen M. S. Sneed
Assistant Examiner—Anthony McFarlan
Attorney, Agent, or Firm—Lyon & Lyon

[57] ABSTRACT

Finely divided, wet-ground, dispersant-free calcium carbonate filler or pigment compositions are disclosed in which the particles of calcium carbonate are distributed in particular amounts in a particular fashion—broadly stated: in fine particle size distribution. Such compositions are useful in aqueous slurry or dry form as opacifying fillers for paper.

5 Claims, 4 Drawing Figures

FINELY DIVIDED CALCIUM CARBONATE COMPOSITIONS

FIELD OF THE INVENTION

This invention relates to novel, finely divided calcium carbonate compositions. More particularly, this invention relates to novel, aqueous or dried, finely divided, wet-ground, dispersant-free calcium carbonate filler or pigment compositions whose average mean particle size and particle size distribution have been adjusted to provide, when such compositions are used as fillers for paper, a balance of filler retention, opacity, brightness and strength characteristics hitherto unobtainable using available ground calcium carbonate fillers, particularly those containing dispersants, and approaching or in some cases equalling that obtainable using typical precipitated calcium carbonate compositions.

BACKGROUND OF THE INVENTION

Finely divided calcium carbonate has long been used by the paper/board industry, alone or more often with other materials, in high solids slurries or dispersions as an opacifying filler or pigment, and as a coating for paper. Many processes for grinding or comminuting calcium carbonate to give slurries or dispersions for these and other end uses, and the finely divided calcium carbonate products obtained thereby, have been described in the prior art. Typically such processes involve either horizontal wet micromedia milling, e.g., sand milling, usually carried out with the use of dispersants and followed by centrifuging, when necessary, to remove the coarsest particles, or vertical wet micromedia milling, usually but not invariably in the presence of dispersants, using microballs, beads or sand. Processes involving hammer milling or the use of jaw, cone or gyratory crushers have also been used to comminute naturally-occurring calcium carbonate. Exemplary of such comminution processes are those disclosed in U.S. Pat. Nos. 3,989,195; 4,166,582; 4,278,208 and 4,325,514 and British Patent No. 1,482,258, all assigned to English Clays Lovering Pochin & Company Limited, and Canadian Patent No. 1,161,010, assigned to Pleuss-Stauffer.

It has now been discovered that certain finely divided, wet-ground, dispersant-free calcium carbonate pigment compositions in which the particle size distribution of calcium carbonate is within limits as set out in detail hereinbelow are particularly suitable for use in aqueous slurry or dry form as opacifying fillers for paper, and that when such pigment compositions are so used they provide a balance of filler retention, opacity, brightness and strength characteristics hitherto unobtainable using available ground calcium carbonate fillers, particularly those containing dispersants, and approaching or in some cases equalling that obtainable using typical precipitated calcium carbonate compositions. It has been discovered in particular that the omission of dispersant greatly enhances the filler retention of papers made using the novel calcium carbonate fillers of this invention. At the same time, these novel fillers increase opacity.

It is, therefore, an object of this invention to provide novel, aqueous or dried, finely divided calcium carbonate compositions.

It is also an object of this invention to provide novel, aqueous or dried, finely divided, wet-ground, dispersant-free calcium carbonate filler or pigment compositions.

A further object of this invention is to provide novel, aqueous or dried, finely divided, wet-ground, dispersant-free calcium carbonate filler or pigment compositions which, when used as fillers for paper, have a balance of filler retention, opacity, brightness and strength hitherto unobtainable using available ground calcium carbonate fillers, particularly those containing dispersants, and approaching or in some cases equalling that obtainable using typical precipitated calcium carbonate compositions.

These and other objects, as well as the nature, scope and utilization of the invention, will become readily apparent to those skilled in the art from the following description, the drawings and the appended claims.

SUMMARY OF THE INVENTION

This invention is based on the discovery that finely divided, wet-ground, dispersant-free calcium carbonate filler or pigment compositions in which the particles of calcium carbonate are distributed in particular amounts in a particular fashion—broadly stated: in fine particle size and narrow particle size distribution—are particularly suited for use in aqueous slurry or dry form as opacifying fillers for paper.

In particular, the particle size distribution in such calcium carbonate compositions must be such that:

1. The size in microns of the calcium carbonate particles at the 50% point ("$D_{50}$") on a SediGraph particle size distribution curve representing the composition, i.e., the point on the curve which represents the size at which 50% of the mass of all particles present in the composition is larger and 50% of the mass of all the particles present in the compositions is smaller, sometimes referred to as the mean particle size, must be no less than about 0.60 $\mu$m and no more than about 1.30 $\mu$m in equivalent spherical diameter. The SediGraph particle size analyzer is made by Micromeritics Instrument Corporation, Norcross, Ga. It measures settling rate to determine particle size distribution by application of Stokes Law.

2. The size in microns of the calcium carbonate particles at the 80% point ("$D_{80}$") on the SediGraph particle size distribution curve divided by the size in microns of the calcium carbonate particles at the 50% point on the curve, or "$D_{80}/D_{50}$", must give a number not less than about 1.40 and no more than about 1.90. $D_{80}/D_{50}$ is an indication of the breadth or slope of the particle size distribution curve. For example, a monodisperse sample would have a $D_{80}/D_{50} = 1.0$. As the particle size distribution broadens, $D_{80}/D_{50}$ will become larger.

3. The size in microns of the calcium carbonate particles at the 20% point ("$D_{20}$") on the SediGraph particle size distribution curve must be no less than about 0.30 $\mu$m and no more than about 0.80 $\mu$m in equivalent spherical diameter. $D_{20}$ is an estimate of the fines in the calcium carbonate composition.

In addition, the calcium carbonate particle size distribution in such compositions, as determined by SediGraph measurements, must be such that:

4. No more than about 2 weight percent of the particles present are larger than about 8 $\mu$m in equivalent spherical diameter.

5. At least about 98 weight percent of the particles present are less than about 8 $\mu$m in equivalent spherical diameter.

6. At least about 97 weight percent of the particles present are less than about 5 μm in equivalent spherical diameter.

7. At least about 90 weight percent of the particles present are less than about 3 μm in equivalent spherical diameter.

8. At least about 75 weight percent of the particles present are less than about 2 μm in equivalent spherical diameter.

9. At least about 35 weight percent of the particles present are less than about 1 μm in equivalent spherical diameter.

10. No more than about 25 weight percent of the particles present are less than about 0.4 μm in equivalent spherical diameter.

Particularly preferred calcium carbonate compositions falling within these limits include the following:

| $D_{50}$, μm | $D_{80}/D_{50}$ | $D_{20}$, μm |
|---|---|---|
| about 0.92 | about 1.74 | about 0.4 |
| about 0.88 | about 1.65 | about 0.38 | wherein the calcium carbonate particle size distribution is such that:

No more than about 2 weight percent of the particles present are larger than about 8 μm in equivalent spherical diameter.

At least about 98 weight percent of the particles present are less than about 8 μm in equivalent spherical diameter.

At least about 97 weight percent of the particles present are less than about 5 μm in equivalent spherical diameter.

At least about 90 weight percent of the particles present are less than about 3 μm in equivalent spherical diameter.

At least about 75 weight percent of the particles present are less than about 2 μm min equivalent spherical diameter.

At least about 40 weight percent of the particles present are less than about 1 μm in equivalent spherical diameter.

No more than about 10 weight percent of the particles present are less than about 0.2 μm in equivalent spherical diameter.

DETAILED DESCRIPTION OF THE INVENTION

Figure 1:
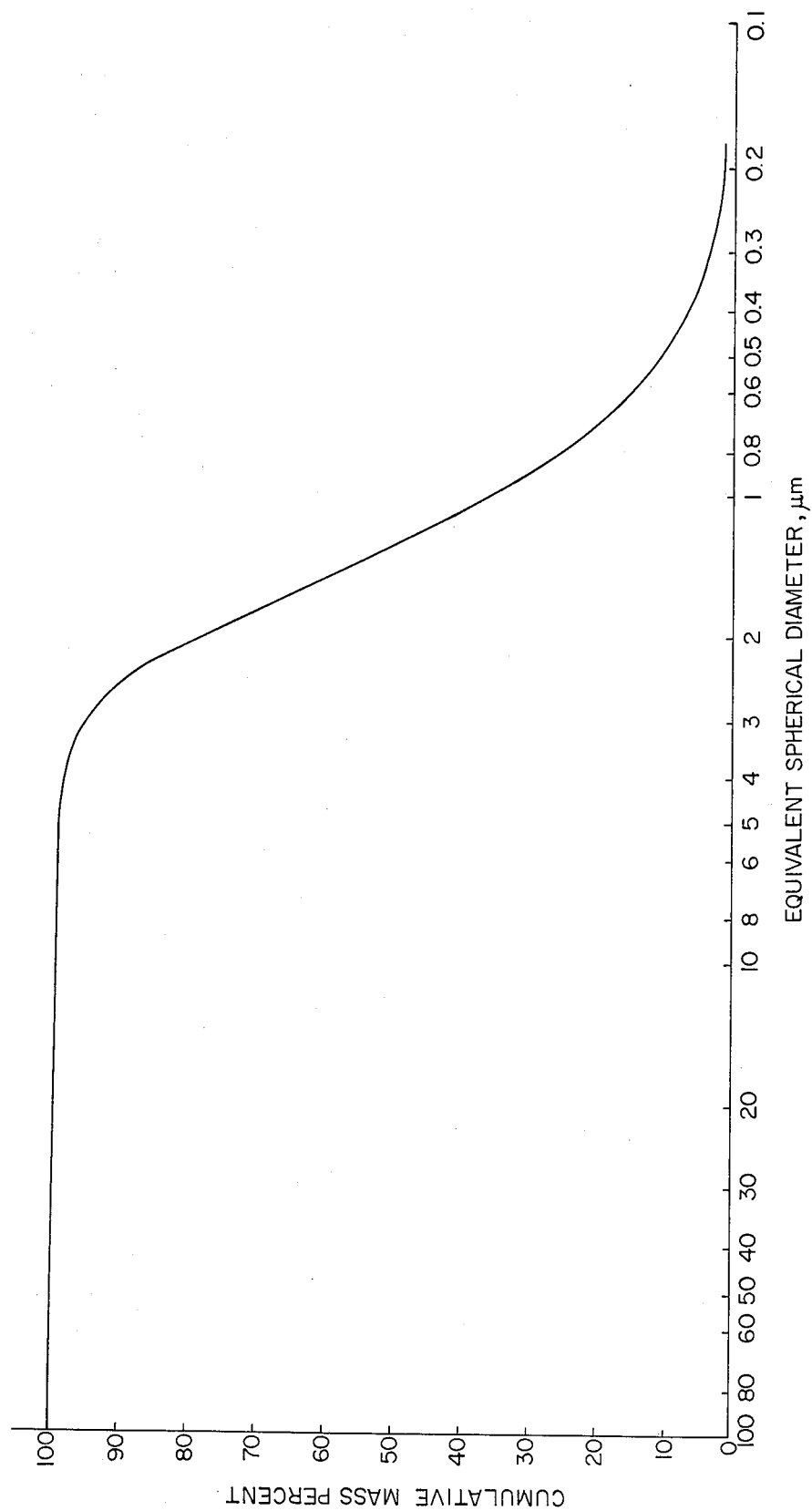
FIG. 1 is a SediGraph particle size distribution curve representing the composition of Example I hereinbelow.

Among the naturally-occurring mineral species of calcium carbonate that can be used in practicing this invention are calcite, aragonite, mixtures of calcite and aragonite or other naturally-occurring minerals associated with aragonite, e.g., mixtures containing from about 5 weight percent to about 99 weight percent, based on the total weight of the mixture, of calcite, with all or substantially all of the remainder of the mixture being aragonite, dolomite, or minor amounts of impurity minerals such as quartz, chlorite, mica, feldspar, pyrite and the like. Chalk can be used in practicing this invention if suitably beneficiated and ground to the appropriate particle size distribution.

Methods of comminuting and classifying naturally-occurring calcium carbonate to provide finely ground materials having the particle size distributions called for by this invention are well known in the art. Exemplary of such methods are:

wet grinding in a ball mill;
wet grinding in a wet vertical media mill;
wet grinding in a wet horizontal media mill;
wet classification by means of a wet centrifugal classifier.

A comminuting and classifying sequence particularly useful in practicing this invention includes grinding in an autogenous mill (first coarse grinding), floating to remove impurities, fine wet grinding in a horizontal micromedia mill, and centrifugal wet classification to remove oversize particles and return them to the wet micromedia mill for further grinding.

The finely divided, wet-ground, dispersant-free calcium carbonate filler or pigment compositions of this invention may be shipped and stored as aqueous slurries containing from about 10% to about 60% by weight solids, or as filter cakes, centrifuge cakes or spray dried powders.

Such aqueous slurries, filter cakes, centrifuge cakes or spray dried powders can also contain minor amounts of flocculants, biocides, and like materials other than dispersants which are typically incorporated in filler or pigment slurries used in paper-making.

Dispersants are typically used in finely divided calcium carbonate-containing slurries to prevent the solids from flocculating and settling out. Dispersants also reduce the viscosity of such slurries, permitting them to flow and be pumped. This is advantageous from a materials handling standpoint and also reduces shipping costs. Dispersants, however, have an adverse effect on filler retention in papers made from calcium carbonate fillers containing them. For example, paper handsheets made under otherwise identical conditions—one group of such handsheets containing Supermite extra fine wet ground calcium carbonate filler produced by Cyprus-Thompson, Weinman and Company together with a dispersant and Kelzan rheology control agent (xanthan gum; Kelco Division of Merck & Co., Inc., Clark, N.J.), the other containing only the extra fine wet ground calcium carbonate filler—were found to differ significantly in filler retention. The sheets made with dispersant-containing filler retained only 37.7% of the filler; the sheets made with filler containing no dispersant retained 82.7% of the filler.

The adverse effect dispersants have on filler retention in turn affects opacity, since the smaller the amount of filler the paper retains the less opaque the paper will be. Adding dispersant to slurries of fillers then used to make paper handsheets under conditions otherwise identical to those used to make paper employing the same filler slurries, but without dispersant, was found to reduce the opacity of the handsheets made from the dispersant-containing slurries by from 1 to 2.5 percentage points, a very significant difference in opacity.

When making paper using aqueous slurries of the finely divided, wet-ground, dispersant-free calcium carbonate filler or pigment compositions of this invention, such slurries will be added to a slurry containing papermaking fibers after pulp disintegration (beating) and before the addition of any retention aid. The amount of aqueous calcium carbonate slurry added will be such that the finely divided calcium carbonate makes up from about 3% to about 30% by weight, on a dry basis, of the total solids in the furnish (filler plus fiber).

The procedure employed in making the handsheets referred to in the working examples hereinbelow was as follows:

Disintegration 1. 60.0 Grams of paper pulp on an oven dry basis were weighed out and divided into two 30 gram portions; each portion was diluted to 2000 ml and disintegrated in a standard TAPPI disintegrator at 3000 rpm for 5 minutes.

2. After disintegration the stock was poured into a 5 gallon bucket and diluted to 18 liters.

Addition of filler and chemicals

1. The pH of the stock was measured and, if necessary, adjusted to pH 7.5 with sodium hydroxide.

2. The weight of filler to be added to the pulp was calculated as follows: amount of filler to be added divided by percent filler added=60 grams oven dried (o.d.) pulp divided by o percent pulp, or:

$$\frac{N \text{ g filler}}{20\% \text{ filler}} = \frac{60 \text{ g o.d. pulp}}{80\% \text{ pulp}};$$

$$N = 15 \text{ g filler}$$

3. Filler slurries were added directly to pulp and mixed, for several minutes, with the weight being calculated on a dry basis.

4. Hercon 48 solution (cationic reactive size; Hercules Incorporated, Wilmington, Del.) was added to the pulp-/filler slurry and mixed for 2 minutes.

5. The pH was adjusted to 8.5 with sodium hydroxide.

6. Fifteen aliquots of 0.1% retention aid solution were weighed for addition to the pulp just prior to handsheet formation.

Checksheet and Calculations

1. With the handsheet mold open the lower portion of the handsheet mold was filled with deionized water. The pH of the water was adjusted to pH 7.5 with sodium hydroxide or sulfuric acid.

2. The surface of the papermaking machine's wire was tapped to release any air bubbles trapped underneath. A clean 9 inch×9 inch screen was placed in the handsheet mold and the mold closed. The handsheet mold was then filled to within 2 inches from the top with deionized water controlled to proper pH. To 1000 ml of pulp furnish there was added the preweighed amount of 0.1% retention aid solution, and the resulting mixture was hand agitated. The 1000 ml of diluted stock was then poured into the handsheet mold.

3. The perforated stirrer was inserted into the mold and moved rapidly up and down five times, keeping the perforated plate beneath the surface of the liquid. On the last up stroke the stirrer was moved slowly and then gently withdrawn.

4. The valve to the white water recirculation tank was opened and the water was removed under vacuum.

5. Immediately after the water drained from the handsheet mold the pump was turned off, the drain valve was closed, the handsheet mold was opened, the screen and paper mat were removed, and the screen placed sheet side up between felts. After turning on the press motor, the felt blanket was placed between the press rolls and the handle pushed all the way down to bring the weights to bear on the rolls.

6. The checksheet was pressed twice to make it easier to remove from screen, then peeled from the screen and dried on a Noble and Wood Hot Plate (low heat setting) until completely dry. The sheet was weighed on a scale to 0.01 g, then the actual consistency of the pulp in the pail was calculated by dividing check sheet weight in grams by 1000 ml to give consistency in g/ml.

Sheet Making

1. The amount of pulp furnish necessary for the second sheet was calculated by dividing the actual weight of pulp/filler in the target sheet by the pulp consistency. Then, the desired sheet weight was divided by the consistency to determine the pulp required per sheet in milliliters.

Example:

2.50 g/1200 ml=0.00208 g/ml pulp consistency 3.28÷0.00208 g/ml pulp consistency=1580 ml pulp furnish.

2. Checksheet steps 1-6 were followed to make the first five filled sheets.

3. The amount of pulp furnish measured out for each sheet was adjusted if the filled sheet weight varied ±0.2 g from the target sheet weight.

4. Fifteen sheets were then made with the pulp and filler mixture. The first 5 sheets were thrown away, the purpose for making them being to increase the fines content of the white water to a point of equilibrium. Sheets 6-15 were saved for testing.

5. Steps 1-4 in making the checksheet were followed in making handsheets 6-15. After forming the handsheet the screen with the sheet up was placed on the felt blanket. The press motor was then turned on. With the leading edge of the felt between the rollers and the top felt folded back over the roller, a blotter was placed squarely on top of the sheet. The lever on the left side of the press was released and pushed all the way down to feed the felt, the screen, the sheet and the blotter through the press rolls.

After the sheet had been pressed, the press handle was raised to its initial position and the felt placed on the press table ready for the next sheet. The sheet and blotter were peeled together from the screen.

6. The sheets were then placed on a Noble and Wood Drum dryer with press blotter and sheet together, sheet side toward drum. The temperature of drum was approximately 200° F. When the sheets were dry to the touch, usually after 2 passes, the blotter was peeled from sheet, care being taken not to wrinkle the sheet. The sheet was then allowed to reach equilibrium moisture content for 24 hours prior to testing.

Handsheet Testing

1. Handsheets were tested for opacity, brightness, burst and tensile strength and sheet weight in accordance with TAPPI procedures. Filler contents and retention values were determined by low temperature ashing.

2. Optical tests were conducted on sheet numbers 9, 11 and 13, and physical tests on the even numbered sheets, unless one of these sheets was not uniform or had other defects, in which case one of the remaining sheets was used in its place. Tests were conducted in the following order: (1) Sheet weight, (2) Opacity, (3) Brightness, (4) Burst, (5) Caliper, (6) Tensile and (7) Paper ash. From this data scattering power, sheet scattering coefficient, pigment scattering coefficient, burst index, tensile index and filler retention were calculated.

The procedure employed in measuring particle size distribution with a SediGraph particle size analyzer, Model 5000D, in the working examples hereinbelow was as described immediately below. All quantities were calculated to add an amount of anionic dispersing agent equivalent to 2 lb./ton of this substance to aqueous slurries and 10 lb./ton to dry samples, so as to provide proper particle dispersion to permit accurate particle size distribution measurements.

I. SLURRY

Slurry Preparation

1. An amount of slurry sufficient to contain 3 grams of calcium carbonate was weighed into a 105 ml beaker with a stirring bar.

$$wt = \frac{300}{\% \text{ solids}} \text{ grams}$$

example: for a 72% solids slurry 300/72=4.17 grams of slurry were used 2. 10 Drops of 1% Colloid 230 solution (an anionic dispersing agent manufactured by North Chemical Co., Marietta, Ga.) were added to the beaker.

3. Deionized water was then added to the 100 ml mark on the beaker.

4. The beaker was then placed on the magnetic stirrer and stirred for 5 minutes.

5. The beaker was then covered with a 4"×4" square of Parafilm and approximately 12 holes were poked in the top.

6. The covered beaker was placed in an ultrasonic bath for 5 minutes, then degassed in a vacuum oven for 5 minutes.

7. Finally, the slurry was magnetically stirred for 2 minutes until ready for particle size determination.

Dry Sample Preparation 1. 3.00 Grams of sample were weighed onto a weighing paper.

2. The sample was transferred from the weighing paper into a 150 ml beaker, taking care to not spill any of the sample.

3. A stirring bar was placed in the beaker and about 50 ml of deionized water was added.

4. The beaker was placed on a magnetic stirrer and, while stirring, 1.5 ml of 1% Colloid 230 solution was added to the contents of the beaker. Note: Depending on the sample more or less Colloid 230 solution may be required to get proper dispersion.

5. Stirring was continued for 2 minutes, or until solid was well dispersed, the stirrer was shut off, and deionized water was added to the 100 ml mark on the beaker, and stirring was resumed for 5 minutes.

6. The beaker was then covered with a 4"×4" sheet of Parafilm and approximately 12 holes were poked in the top.

7. The covered beaker was placed in an ultrasonic bath for 5 minutes, then degassed in a vacuum oven for 5 minutes.

8. Finally, the slurry was magnetically stirred for 2 minutes until ready for particle size determination.

Particle Size Determination

1. The sample was placed in the sample compartment of the SediGraph 5000 D over the stirring mechanism and the stirrer speed turned up until the sample was turbulent enough to prevent settling.

2. The recorder was loaded with fully labeled graph paper according to the SediGraph manufacturer's instruction.

3. The "Run" switch was turned to "Reset" and then to its center "Off" position, and the 100 percent knob turned fully clockwise.

4. The approximate starting diameter was then set, stopping short of the desired starting diameter.

5. The recorder reference baseline (0 percent on the graph) was checked, using the "Zero" knob and "Zero" push button.

6. The cell was flushed and filled with clean liquid and the recorder baseline (0 percent on the graph) was set, using the 0 percent knob.

7. The dispersed sample was loaded into the sample cell.

8. The recorder was adjusted to 100 percent on the graph using the 100 percent knob, care being taken not to adjust below a setting of 500.

9. The exact starting diameter was set at 50 μm.

10. The temperature was then measured and the proper rate calculated.

11. The proper rate was switched in after measuring the temperature; 473 at 32°.

12. The cell was removed, inspected for bubbles, and replaced.

13. the starting diameter was rechecked and the recorder set to 100 percent on the graph paper.

14. The analysis was then started by switching the "Run" switch to "On".

15. The cell was then cleaned and flushed, leaving it filled with clean water.

16. The graph was removed and the analysis reported at the desired diameters.

EXAMPLE I

Limestone was ground in a 30 inch×42 inch jaw crusher to minus 3½ in. particle size. This material was then screened to remove particles smaller than ¼ inch.

The minus 3½ inch, plus ¼ inch stone was autogenously wet ground at 30% solids in a 500 horsepower 7 foot diameter by 26 foot long tube mill to a particle size of 95 percent minus 200 mesh. This slurry was then treated with Alkazine T0 (imidazoline; Alkaryl Chemical Co.) an amine flotation reagent, in an amount of approximately ¼ lb./ton of solids in the slurry (this amount can vary slightly depending on the amount and type of impurities present in the limestone starting material), and beneficiated by flotation to remove silica and silicate impurities.

Following flotation the slurry was passed through a Townley Hydroclone wet cyclone to remove particles larger than about 50 microns. The fines discharge from the cyclone was further classified in a 54 inch by 70 inch wet centrifugal classifier manufactured by Bird Machine Co. of South Walpole, Mass. to produce a slurry of particles having a mean particle size of 1.3 microns.

The slurry was transferred to a bowl thickener and 0.1 pound of Tamol 901, an anionic flocculating agent manufactured by Rohm & Haas Company, was added to the slurry for each ton of limestone to accelerate settling of the solids to a solids concentration of 41.7%.

A 3 gram sample, on a dry basis, of the settled solids was dispersed in water to give 100 ml of slurry, using 2 ml of 1% Colloid 230 solution, an anionic dispersing agent and the particle size distribution was measured with a SediGraph particle size analyzer, Model 5000D.

Figure 2:
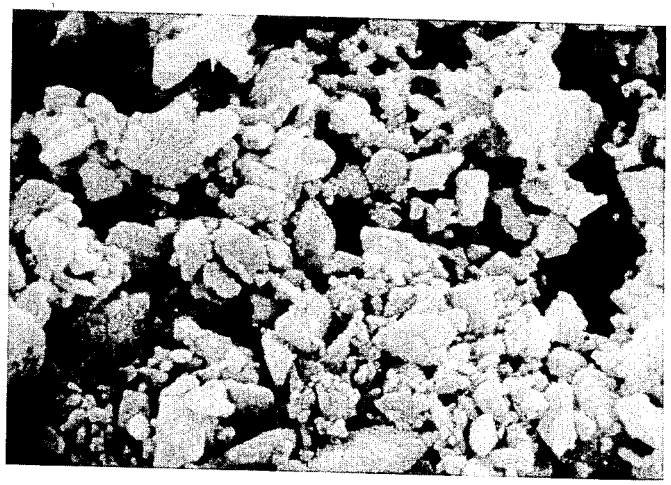
FIG. 2 is an electron micrograph (10,000×) taken to illustrate typical particles in the composition of Example I hereinbelow.

The SediGraph particle size distribution curve obtained for this composition is attached as FIG. 1. An electron micrograph (10,000×) of the particles in this composition is attached as FIG. 2.

The $D_{50}$, $D_{80}/D_{50}$, $D_{20}$ and particle size distribution values for this calcium carbonate composition were found to be as follows: $D_{50}$, 1.3 μm; $D_{80}/D_{50}$, 1.63; $D_{20}$, 0.7 μm.

Particle size distribution about 2 wt. % particles larger than about 4 μm at least about 90 wt. % particles smaller than about 2.6 μm at least about 75 wt. % particles smaller than about 2 μm at least about 60 wt. % particles smaller than about 1.6 μm at least about 50 wt. % particles smaller than about 1.3 μm at least about 30 wt. % particles smaller than about 0.9 μm about 20 wt.% particles smaller than about 0.7 μm A portion of the thickened slurry was added to a slurry of bleached wood pulp consisting of 75% hardwood fibers and 25% softwood fibers refined to a Canadian Standard Freeness of 379 cc. The calcium carbonate slurry was added so that the final pulp plus slurry contained 20 pounds of calcium carbonate for each 80 pounds of oven dried wood pulp. To this slurry there was then added 2.5 pounds of Hercon 85 cationic sizing agent, manufactured by Hercules Chemical Co., Wilmington, Del., and 0.3 pounds of Reten 523 P anionic retention aid, also manufactured by Hercules, for each ton of total solids in the slurry. Paper was made from the resulting furnish on a Lou Calder pilot plant paper machine at Western Michigan University. The resulting paper is referred to herein as Paper A.

An identical papermaking procedure was followed in which the filler was a commercial anionically dispersed calcium carbonate slurry of essentially the same particle size distribution. The resulting paper is referred to herein as Paper B.

Papers A and B were analyzed for calcium carbonate content, from which filler retention was calculated, and measurements were made of the opacity and brightness of the paper sheets, from which sheet scattering coefficients and pigment scattering coefficients were calculated. The results obtained were as follows:

|  | Retention, % | Opacity, % | Sheet Scattering Coefficient | Pigment Scattering Coefficient |
| --- | --- | --- | --- | --- |
| Paper A | 76.7 | 85.6 | 517 | 1707 |
| Paper B | 48.9 | 82.1 | 432 | 1632 |

Paper A, filled with a calcium carbonate composition prepared in accordance with this invention, retained much more of the filler and had a much higher opacity than paper B, filled with a commercial anionically dispersed calcium carbonate slurry. The opacity and sheet scattering coefficient of paper A would be expected to be higher than those of paper B because of the higher filler content of paper A. The higher pigment scattering coefficient of paper A, however, shows that the filler in this paper contributes higher opacity to the paper than does the commercially available anionically dispersed calcium carbonate filler when the differences in filler content are taken into consideration.

EXAMPLE II

Figure 3:
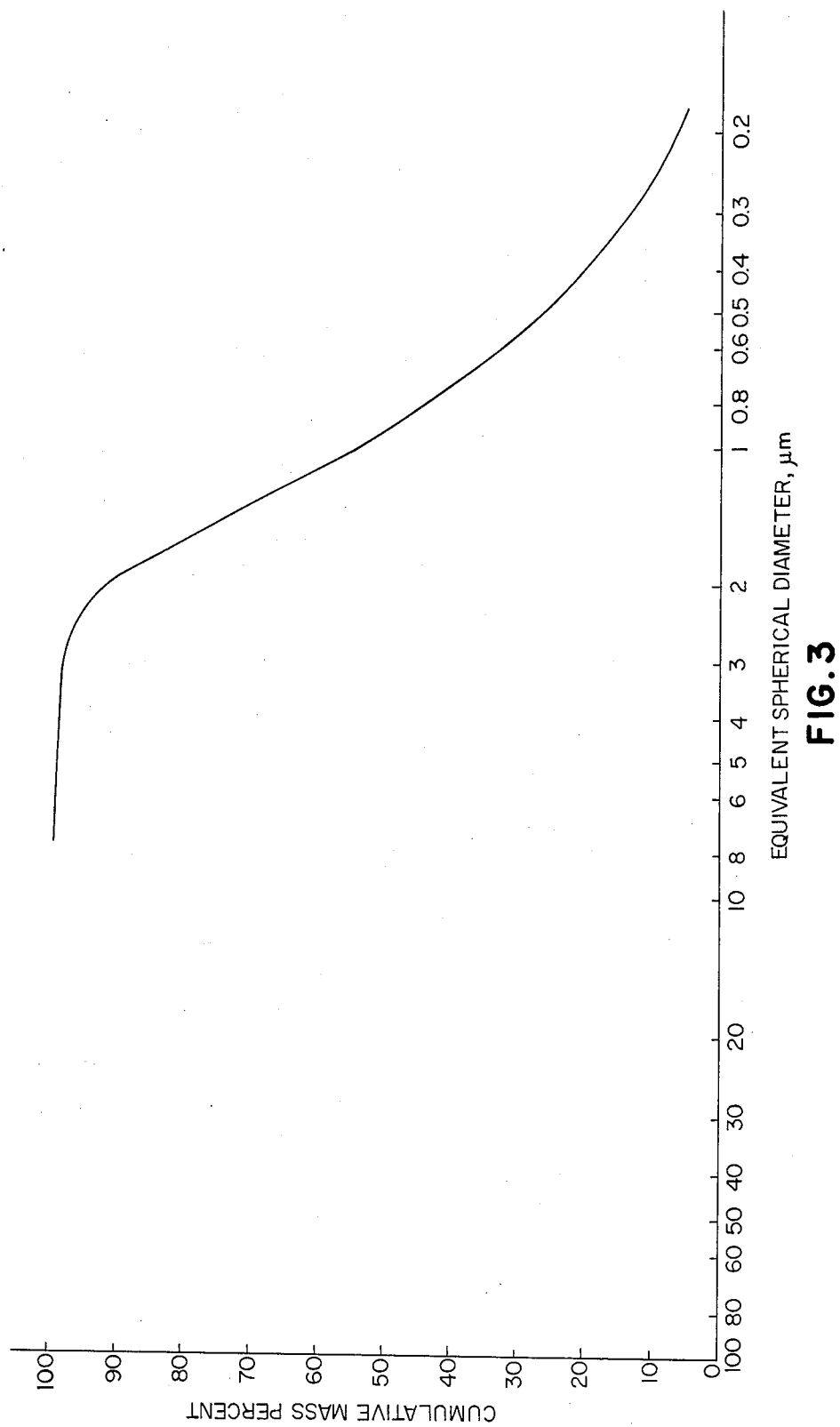
FIG. 3 is a SediGraph curve representing the composition of Example II herein below.
Figure 4:
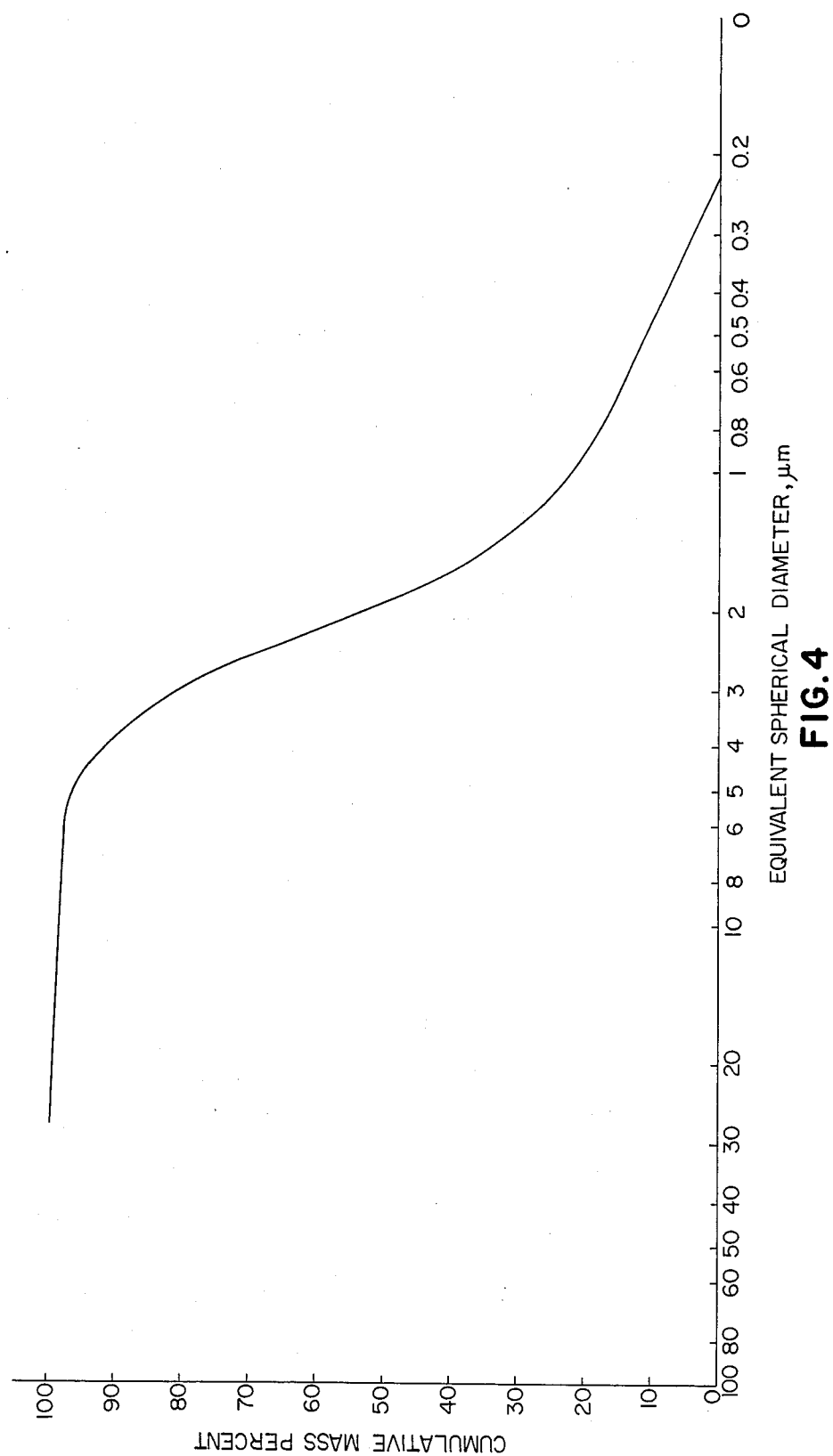
FIG. 4 is a SediGraph curve representing the composition of Comparative Example A hereinbelow.

A quantity of limestone was wet ground, purified by flotation, passed through a wet cyclone to remove oversize particles and classified in a centrifugal classifier in the manner set forth in Example I hereinabove. A portion of the fines discharged from the centrigual classifier was further classified in a second centrifugal classifier to produce a slurry of particles having a mean particle size ($D_{50}$) of 0.92 micron, a $D_{80}/D_{50}$ ratio of 1.74, and a $D_{20}$ of 0.4 micron. The SediGraph particle size distribution curve obtained for this product is attached as FIG. 3. No flocculant was added to this slurry, which contained 10.6 percent solids.

A portion of this slurry was added to a slurry of bleached wood pulp consisting of 75% hardwood and 25% softwood fibers refined to a Canadian Standard Freeness of 350cc. The calcium-carbonate slurry was added in such a quantity that the final slurry contained 20 pounds of calcium carbonate for each 80 pounds of oven dried pulp. The same sizing and retention aid employed in Example I were added to this slurry in the same quantities as in Example I. This slurry was then made into 8×8 inch sheets of paper on a Noble and Wood Handsheet Machine with white water recirculation. The sheets were pressed on a Noble and Wood roll press with a felt blanket and dried on a Noble and Wood drum dryer, and then allowed to equilibrate with atmospheric moisture to a moisture content of 7–8%.

The thus-obtained sheets were analyzed for calcium carbonate content and their optical properties were measured. The resulting paper is referred to herein as Paper C.

The same procedure was followed to make paper handsheets in which the filler was a commercial anionically dispersed calcium carbonate slurry having a mean particle size ($D_{50}$) of 1.0 micron and a $D_{80}/D_{50}$ ratio of 2.0. These sheets were analyzed in the manner described hereinabove for calcium carbonate content, and their optical properties were measured. The resulting paper is referred to herein as Paper D.

The properties measured for these two papers are shown in the table below:

|  | Retention, % | Opacity, % | Sheet Scattering Coefficient | Pigment Scattering Coefficient |
| --- | --- | --- | --- | --- |
| Paper C | 92.0 | 90.4 | 598 | 1823 |
| Paper D | 37.7 | 83.9 | 391 | 1362 |

The paper filled with calcium carbonate prepared in accordance with this invention retained much more of the calcium carbonate than the paper filled with the commercial anionically dispersed calcium carbonate slurry. It also showed a much higher pigment scattering coefficient, demonstrating that calcium carbonate prepared in accordance with this invention has greatly superior filler properties in paper than does presently commercially available anionically dispersed ground calcium carbonate.

COMPARATIVE EXAMPLE A

A quantity of limestone was ground, purified by flotation and the oversize particles removed by centrifugal classification in the manner set forth in Example I hereinabove. A portion of the fines discharged from the centrifugal classifier was then further classified in a wet centrifugal classifier as set forth in Example II hereinabove, but the rotational speed of the classifier was reduced and the throughput rate was increased so that the particle size of the product was larger than those of the calcium carbonate slurry products of Examples I and II; $D_{50}=1.8$, $D_{80}/D_{50}=1.8$.

Two sets of paper handsheets were made in the manner previously described above using this product as a filler. Analysis of the handsheets and testing of their optical properties resulted in the data in the following table. These handsheets are designated as Paper E and Paper F.

|  | Retention, % | Opacity, % | Scattering Coefficient | Pigment Scattering Coefficient |
|---|---|---|---|---|
| Paper E | 97.4 | 90.0 | 583 | 1668 |
| Paper F | 99.4 | 88.5 | 565 | 1547 |

From these data it can be seen that elimination of the dispersant resulted in very good retention of the filler in the paper. However, the pigment scattering coefficients are significantly lower than those of Papers A and C in Examples I and II, showing that the large mean particle size of the filler of this comparative example made it a less efficient opacifying agent than the fillers made in accordance with this invention.

The above discussion of this invention is directed primarily to preferred embodiments and practices thereof. It will be readily apparent to those skilled in the art that further changes and modifications in the actual implementation of the concepts described herein can readily be made without departing from the spirit and scope of the invention as defined by the following claims.

We claim:

1. A finely divided, wet-ground, dispersant-free calcium carbonate composition in which the particle size distribution of calcium carbonate is such that:
   (a) the size of the calcium carbonate particles at the 50% point on a SediGraph particle size distribution curve representing the composition is from about 0.60 μm to about 1.30 μm in equivalent spherical diameter,
   (b) the size of the calcium carbonate particles at the 80% point on said distribution curve divided by the size of the calcium carbonate particles at the 50% point on said distribution curve gives a number of from about 1.40 to about 1.90,
   (c) the size of the calcium carbonate particles at the 20% point on said distribution curve is from about 0.80 μm to about 0.30 μm in equivalent spherical diameter, and the overall sizes of calcium carbonate particles present are such that:
   no more than about 2 weight percent of the particles present are larger than about 8 μm in equivalent spherical diameter;
   at least about 98 weight percent of the particles present are less than about 8 μm in equivalent spherical diameter;
   at least about 97 weight percent of the particles present are less than about 5 μm in equivalent spherical diameter;
   at least about 90 weight percent of the particles present are less than about 3 μm in equivalent spherical diameter;
   at least about 75 weight percent of the particles present are less than about 2 μm in equivalent spherical diameter;
   at least about 35 weight percent of the particles present are less than about 1 μm in equivalent spherical diameter, and
   no more than about 25 weight percent of the particles present are less than about 0.4 μm in equivalent spherical diameter.

2. A calcium carbonate composition as recited in claim 1 wherein the size of the calcium carbonate particles at the 50% point on said distribution curve is about 0.92 μm in equivalent spherical diameter, the size of the calcium carbonate particles at the 80% point on said distribution curve divided by the size of the calcium carbonate particles at the 50% point on said distribution curve gives a number about 1.74, the size of the calcium carbonate particles at the 20% point on said distribution curve is about 0.4 μm in equivalent spherical diameter, at least about 40 weight percent of the particles present are less than about 1 μm in equivalent spherical diameter, and no more than about 10 weight percent of the particles present are less than about 0.2 μm in equivalent spherical diameter.

3. A calcium carbonate composition as recited in claim 1 wherein the size of the calcium carbonate particles at the 50% point on said distribution curve is about 0.88 μm in equivalent spherical diameter, the size of the calcium carbonate particles at the 80% point on said distribution curve divided by the size of the calcium carbonate particles at the 50% point on said distribution curve gives a number about 1.65, the size of the calcium carbonate particles at the 20% point on said distribution curve is about 0.38 μm in equivalent spherical diameter, at least about 40 weight percent of the particles present are less than about 1 μm in equivalent spherical diameter, and no more than about 10 weight percent of the particles present are less than about 0.2 μm in equivalent spherical diameter.

4. A calcium carbonate composition as recited in any one of claims 1–3 in the form of an aqueous slurry.

5. An aqueous calcium carbonate slurry as recited in claim 4 having a solids content of from about 10% to about 60% by weight, based on the total weight of the slurry.

* * * * *